INVENTORS
GERHARD KOHN
DIETER SEITZER
BY George Baum
ATTORNEY

United States Patent Office 3,445,682
Patented May 20, 1969

3,445,682

SIGNALS EMPLOYING A TRISTABLE TUNNEL DIODE SENSING CIRCUIT

Gerhard Kohn, Thalwil, and Dieter Seitzer, Gattikon, Switzerland, assignors to International Business Machines Corporation, Armonk, N.Y., a corporation of New York Filed Dec. 20, 1965, Ser. No. 514,819
Int. Cl. H03k 5/20
U.S. Cl. 307—236 2 Claims

ABSTRACT OF THE DISCLOSURE

A tristable sensing circuit is employed to sense the bipolar outputs of a thin film memory, wherein such sensing circuit is made insensitive to the backswing of such sense signals. Strobing pulses during "read" time can be several times longer than the sense signal pulse trains yet the discrimination between the information pulse and undesired backswing pulse can be made at a very rapid rate.

The invention concerns a circuit for detecting very small current pulses and discriminating as to their polarity. The circuit is suitable for use in the technology of computers and data processing machines and of control systems having open or closed loops. In particular, it serves for detecting and interpreting the sense signals of a binary magnetic memory.

The operating rate of fast computer memories, e.g., thin magnetic film memories, is largely dependent upon the attainable operating rate of the peripheral units such as address control, sense amplifiers, and logic circuits; for the extremely short switching times of thin magnetic films can be exploited to shorten the memory cycles only if the peripheral units are also capable of operating at high speeds. When the memory is being interrogated, the voltage signals induced in the sense lines are often very weak and disturbed by noise signals, so that extreme requirements are made of the circuits serving for unequivocal discrimination of the information read out. Here, detector circuits are used which determine the presence of current pulses bearing information and so interpret them that they pass unequivocal output signals on to the following logic circuits.

Sense signals typical for a certain kind of thin magnetic film memory have a wave form consisting essentially of two consecutive current pulses of opposite polarity, only the first pulse, of the one polarity direction, representing binary information. If such a positively directed first pulse represents the read-out information value "1," there is a risk that the following negatively directed, satellite pulse will erroneously simulate the presence of a further information value "0." The circuit must therefore be capable of interpreting only the polarity of the leading edge of the first pulse, representing the information, as the criterion for detecting this information value, and of ignoring the backswing of the following pulse or other peculiarities of the wave form.

Known detector circuits for bipolar pulses as input stages of a sense amplifier contain semiconductor elements of which some respond to a positive, and the rest to a negative, going pulse, and which deliver an amplified signal. There is now the risk, if no special measures are taken, that one of the elements responds but that, owing to the backswing of the following pulse, the other element does too, so that unequivocal discrimination of the information read out becomes impossible. To overcome this disadvantage, pairs of tunnel diodes have been used as bistable elements, a certain safety being achieved by doubling the circuit.

Each of the diodes employed in the present invention has a different response threshold. A strobe pulse initially biases the tunnel diodes to their respective voltage states. The bias is reduced to present the tunnel diode circuit to a predetermined neutral operating point. Depending on the polarity of the input signal, either one diode is switched or the other. After this first switching, no other switching action can take place due to the presence of a larger threshold that must be overcome to switch back either tunel diode. Thus, the spurious signals occurring after the information-bearing signal are inhibited from appearing at an output terminal. The triggering thresholds are adjustable by employing a voltage divider network in the tunnel diode circuit.

It is therefore an object of the invention to provide a detector circuit suitable for low-level bipolar signals which is insensitive to disturb signals, particularly the backswing of the following pulse. This object is achieved in the invention by a circuit design with a special characteristic line which makes possible tristability of the circuit.

It is a further object to obtain a highly discriminating bipolar detecting circuit for thin film memories employing a novel tristable tunnel diode detector circuit.

The detector circuit for low-level bipolar signals, which are so interpreted as current pulses of different wave form that the polarity of their leading edge provides the criterion for the output signals to be formed, is characterized by the fact that the circuit has a current-voltage characteristic with five consecutive sections of alternating positive and negative differential resistance, so that three stable states or operating points are possible; that means are provided for setting the circuit to its center operating point; and that the circuit is capable of delivering different distinguishable output signals depending upon the position of the operating point.

The method for operating the detector circuit for detecting and interpreting the sense signals of a binary thin magnetic film memory is characterized by the fact that at the start of an operating cycle the circuit is set to its center operating point by a special strobe pulse, that the sense signals are delivered to the detector as input signals, and that these input signals trigger a switching process in which the operating point of the detector circuit is displaced into one of the outer stable positions of the tristable characteristic line, depending upon the polarity of the leading edge of the input signals, so that an output signal (positive or negative), polarized in accordance with the binary information read-out (1 or 0), is produced. A subsequent signal of opposite polarity, during such single strobe pulse cycle, produces no output signal.

There are various possibilities for realizing a circuit with the required characteristic. Electron tubes, discharge tubes, magnetic elements, or semiconductor elements such as transistors, as well as combinations of these elements, can be used. The circuit can be utilized for building logic circuits, also with ternary logic. The design of very sensitive three-level control circuits is also possible.

Merely to illustrate the operation of the invention, a particular embodiment, namely, a fast detector circuit operating with tunnel diodes, is shown and described. This circuit is particularly suitable for interpreting the sense signals of a binary thin magnetic film memory. The invention is, however, directed generally toward circuits wherein the current-voltage characteristic line is bent four times and is therefore not confined to the circuit shown in the drawings.

In the drawings:

FIG. 1 is a current-voltage characteristic of the circuit of the invention with three possible operating points.

FIGS. 2*a* and 2*b* are examples of sense signals of a binary thin magnetic film memory that will be sensed by the present invention.

Figure 1:
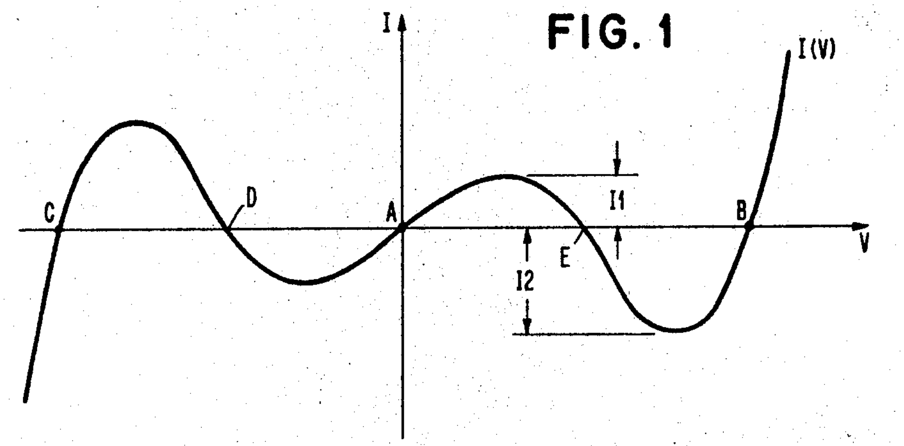

FIG. 1 shows the basic trend of the required current-voltage characteristic line $I=I(V)$ in arbitrary units. Five consecutive sections can be distinguished having differential resistances with alternating sign. In the third quadrant the characteristic line with positive slope begins, crosses the V axis at point C and reaches a positive current maximum in the fourth quadrant at relatively small negative voltage values. A second section of negative slope crosses the V axis at D and next follows another section with positive slope which, through the coordinate origin designated with A, passes into the first quadrant and extends to a current maximum at relatively small positive voltage values. Then follows a fourth section with negative slope that passes the V axis at point E to a current minimum in the second quadrant at relatively high positive voltage values. A fifth section, with positive slope, crosses the V axis at B and continues into the first quadrant. To achieve equal sensitivity for positive and negative signals, the characteristic of the circuit should be symmetrical.

The current-voltage characteristic $I=I(V)$ of FIG. 1 has three sections with rising slope and a section of falling slope between two consecutive positive slopes. The differential resistance of the sections of falling slope is negative. At zero current, only three stable operating points are possible, such points being designated as A, B, and C. The cross points D and E of the characteristic with the abscissa axis lying between them are not possible as stable operating points of the circuit, since they lie on sections of the characteristic line with negative differential resistance.

Assume that the circuit is set to the center operating point A, the coordinate origin in FIG. 1. A small positive current delivered to the circuit to be described displaces the operating point in the first quadrant on the rising branch of the characteristic in the direction toward the maximum. If the delivered current remains below value I1, the circuit returns to operating point A after the current pulse has faded. If the current exceeds the maximum of value I1, the next characteristic line section with negative differential resistance is discontinuously traversed, and the circuit jumps to a value on the rising fifth branch of the characteristic line in the first quadrant which exceeds operating point B by the amplitude of the current fed in. After the current pulse has faded the circuit remains in the stable state corresponding to operating point B. Since a defined positive voltage condition now exists, a corresponding output signal can be read out.

If the positive going current pulse is followed by a pulse with negative amplitude but whose value is below the I2 minimum, the circuit remains in the upper stable state( returns to operating point B) after the negative current pulse has faded. If the negative current pulse exceeds I2, however, the center area of the characteristic is also traversed, and the circuit passes into the lower stable state which, after the delivered negative current pulse has faded, is characterized by operating point C.

Analogous considerations apply when the circuit is set to center operating point A and a negatively directed current pulse is fed in. If it is a larger than the minimum in the third quadrant and a possible, now positive, backswing smaller than the maximum in the fourth quadrant, the circuit passes into the lower stable position characterized by operating point C and a defined negative voltage, which can form the basis for an output signal to the read out.

Figure 2A:
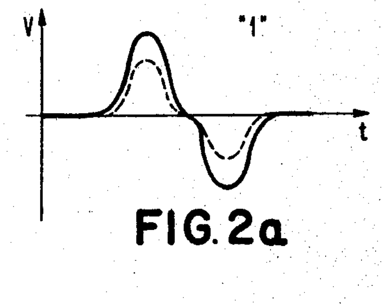
Figure 2B:
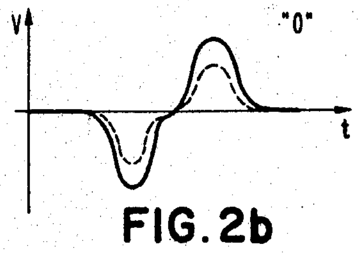

FIG 2 shows the sense signals typical for one kind of binary thin magnetic film memory versus time as voltage pulses V($t$) Let the signal induced in the sense lines of the memory be a binary "1," that is, the first pulse is positive going and the following one negative, as in FIG. 2*a* Analogously, let the "0" signal consist of a negative pulse followed by a positive pulse, as in FIG. 2*b*. The best achievable sense signals are now indicated by fully drawn lines. As the broken lines are intended to show, however, the sense signals can be decreased in amplitude, e.g., through the effects of damping of the drive lines of the memory. Not shown, are wave form deformations due to some kind of disturbing effects causing the first pulse, representing the information, to be of lower amplitude than the following reverse pulse. Additional oscillations or disturbances of the pulses, usually of lower amplitude, can also occur in the operation of a thin magnetic film memory.

The detector circuit used as sense detector should be capable of unequivocally determining and interpreting only the information-representing signals. Care must therefore be taken to ensure that in the circuit actually built, the value I1 of the I-V characteristic, as in FIG. 1, is smaller than the worst sense signal, and I2 larger than the largest possible disturb signal. The current pulses fed to the circuit are, in general, to be regarded as proportional to the voltage pulses shown in FIG. 2.

The tunnel diode is a semiconductor element that is, per se, passive but, in conjunction with a suitable bias voltage or an intrinsic current from a source for delivering the energy, is capable of acting like an active element with a characteristic line having a negative differential resistance in its center section. It has the additional advantage that the transition processes characterizing the switching behavior take place extremely rapidly, which is particularly desirable for the developing of the peripheral switching circuits of thin magnetic film memories. A peculiarity of tunnel diodes is, of course, their two-pole property, i.e., input and output of the circuit are identical, so that measures for separating the input and output signals are necessary.

Figure 3:
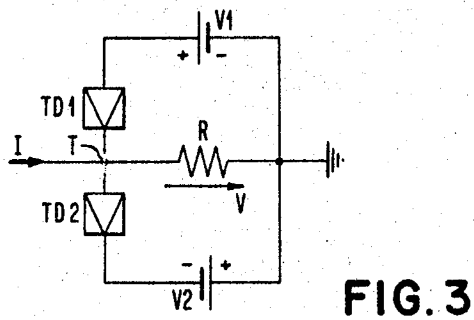
FIG. 3 is an example of a circuit with tunnel diodes employed in this invention.

FIG. 3 shows a simple example of a circuit with tunnel diodes which has the required characteristic. The circuit consists of the parallel connection of three branches, the first comprising a forward biased tunnel diode TD1 in series with its voltage source V1. The second branch is also formed by a forward biased tunnel diode TD2 in series with its voltage V2, but this second tunnel diode and its bias source are polarized in the opposite direction from that of the corresponding elements of the first branch with respect to input current I. The third branch is formed by an ohmic resistance which must meet special dimensioning requirements that will be described below under FIG. 4. The input current pulses I are fed to the terminal T which is the common point where the cathode of tunnel diode TD1 is connected to the anode of tunnel diode TD2 and resistance R. The other side of the parallel circuit is grounded. The direction of voltage V on which the following consideration is biased is entered next to the resistance R as an arrow.

Figure 4:
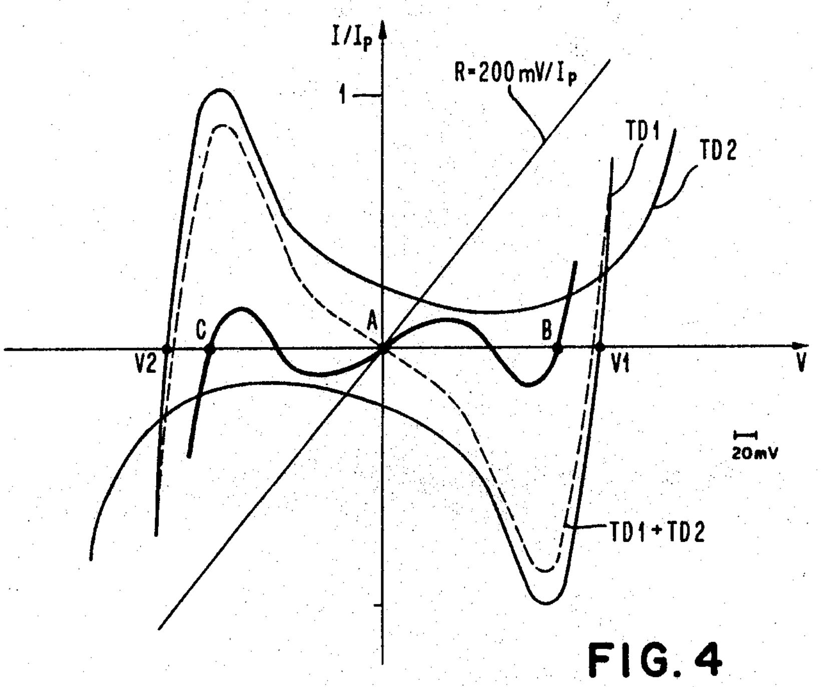
FIG. 4 is an illustration of the derivation of the current-voltage characteristic line employed to described the operation of the invention.

As can be seen from the current-voltage characteristics of FIG. 4, the symmetrical tunnel diodes are biased with 200 mv. The characteristic lines of the individual elements are shown finely traced. The characteristic line of tunnel diode TD2 is displaced to the left with respect to the I–V coodinate system of axes by negative bias $V2=200$ mv. The characteristic line of tunnel diode TD1 is shown turned by 180°, due to the assumed reference direction of the voltage (arrow in FIG. 3), and displaced to the right by positive bias $V(I)=+200$ mv. The current scale of the I axis is normalized to the peak current $I_p$ of the tunnel diode used, so that the peak current in the diagram is designated with the dimensionless number 1. As a passive element, the ohmic resistance R has as the characteristic line a straight line passing through the coordinate origin and the first and third quadrant. The resistance value is chosen as the quotient of bias voltage and peak current, so that in this example $R=200$ mv./$Ip$.

To determine the characteristic of the entire circuit, the tunnel diode characteristics are first combined into the sum characteristic $TD1+TD2$, shown in broken lines. There is to be combined with te resistance straight line to derive the current-voltage characteristic $I(V)$ of the circuit. As can be seen from the figure, the resulting characteristic line of the circuit, due to the chosen dimensions of parallel resistance R, is the five times bent current-voltage characteristic $I=I(V)$ of FIG. 1 traced in full. For the sake of clarity, the possible stable operating points A, B, and C of the circuit are entered in the diagram.

In practice, it is naturally cumbersome to provide two separate bias sources. In the circuit shown in FIG. 5, common bias source V*s* is used to which two series-connected tunnel diodes TD1 and TD2 can be connected. A voltage divider consisting of two series-connected resistors R1 and R2 is connected parallel to the branch with the two tunnel diodes TD1 and TD2. The resistor R is inserted between the point common to the two tunnel diodes (between cathode TD1 and anode TD2), in the middle of the first-named branch, and the center tap of the voltage divider consisting of resistors R1 and R2.

It should be noted that the dimension requirements for the resistance are different in this circuit, since here the partial resistors of the voltage divider enter into the resistance value determining the tristable current-voltage characteristic. Input terminal 11 for feeding current pulses I of the input signal is connected to the leads common to the two tunnel diodes. The other lead of one of the two tunnel diodes, here tunnel diode 2, is connected to the second input terminal 12. If necessary, the part of the circuit with the second input (and output) terminal 12 is grounded at point 14. Since tunnel diodes are two-poles, output terminal 13 is also connected to the leads common to the two tunnel diodes TD1 and TD2.

The following condition applies for the dimension of the resistors:

$$\frac{200\text{ mv.}}{0.75Ip}>R+\frac{R1\cdot R2}{R1+R2}>\frac{200\text{ mv.}}{1.25Ip}$$

where I*p* is the peak current of the tunnel diodes in milliamperes. If, with the use of differing tunnel diode types, the bias is no longer of the order of 200 mv., corrected values are to be substituted accordingly. Resistor R is now in series with the two parallel-connected voltage divider resistors R1 and R2. The dimension requirement serves particularly to create a useful ratio between the current values I1 and I2 defined under FIG. 1. Certain tolerance asymmetries can be corrected by changing the voltage V*s*. Asymmetries of the threshold values, e.g., I1 in one half of the circuit and the analogous value I1 in the other half of the circuit, can be corrected by minor changes in the voltage divider ratio. Actually the tunnel diode characteristic values and the biases, and thus also the voltage divider resistors, should be equal for each pair. To correct possible characteristics line deviations of the two tunnel diodes used, the voltage divider resistances R1 and R2 should be adjustable. If, however, one regards the circuit group consisting of two tunnel diodes and three resistors as a building block of the circuit, e.g., produced in a modular fashion like printed circuits, then the most advantageous resistance ratio can be tailored during production and is then fixed once and for all, matched to the tunnel diodes built in.

Figure 5:
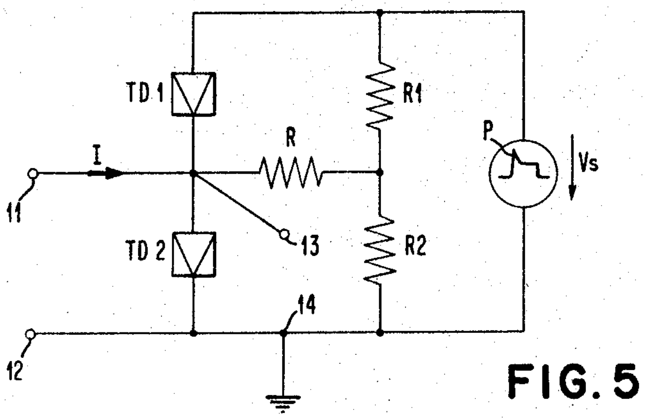
FIG. 5 is another embodiment of the invention.

The circuit example of FIG. 5 can be used for the detection and interpretation of the sense signals of a binary thin magnetic film memory. To separate, with respect to time, the input and output signals, which in practice must pass the same pair of terminals, the bias source is switched on only temporarily as strobe pulse V*s* belonging to the machine cycle. Provision is also made to first set the circuit to center operating point A at the start of each read out operation. The sense signals are fed as input signals to the detector where they trigger a switching process or transition in such a way that the operating point of the detector circuit is displaced into one of the two outer stable positions (B or C) of the tristable characteristic line in accordance with the polarity of the leading edge of the input signals. The amplified output signal, a positive or negative pulse polarized in accordance with the binary information (1 or 0) read out, receives its energy from the strobe pulse V*s* delivered by the memory control of the computer. To ensure at the start of each read out operation that the detector circuit is first set in its initial state in the center position corresponding to operating point A, strobe pulse V*s* on its leading edge has an overtension peak P, as is graphically shown in FIG. 5. Values of about 25% overshoot have proved suitable.

Owing to the overtension P, the two tunnel diodes are first switched into their respective upper stable voltage state (of their own tunnel diode characteristic). With the fading of voltage V*s* to its normal value, the bias voltages V1 and V2 assume such values that the circuit is set to center operating point A of the tristable characteristic line. By means of the memory control, one must obviously ensure that at this first setting period no input current pulse is fed in that could adversely affect the setting process. During the following period, which corresponds approximately to the center of the strobe pulse, the detector circuit is sensitive to sense signals, causing the transition process to go to one of the outer stable positions of the tristable characteristic line I(V). The strobe pulse which is still present at that time provides the energy for the output signal, which is then switched through the tunnel diodes.

Although the detector circuit according to the invention was described for a preferred embodiment, numerous changes in form, detail, and use can be made by one skilled in the art without departing from the scope of the invention.

What is claimed is:

1. A detector circuit for sensing bipolar signals representing binary information comprising two series connected tunnel diodes having a first junction point, a voltage divider consisting of two series-connected resistors ($R_1$ and $R_2$) connected in parallel with said series-connected tunnel diodes, said resistors having a second junction point, a resistor ($R_3$) inserted between said junction points, means for applying input binary signals to and obtaining output signals from said circuit at said first junction point, and single means for applying a reset voltage to said series-connected tunnel diode circuit prior to and immediately after the receipt of a sense signal at said first junction point as well as a biasing voltage to said series-connected tunnel diode circuit during and immediately after the receipt of said sense signal at said junction point.

2. The circuit of claim 1 wherein said circuit attains a tristable current-voltage characteristic by selecting the values of $R_1$, $R_2$ and $R_3$ such that $$\frac{200\text{ mv.}}{0.75Ip}>R_3+\frac{R_1R_2}{R_1+R_2}>\frac{200\text{ mv.}}{1.25Ip}$$

where $R_1$, $R_2$ and $R_3$ are in ohms, mv. represents millivolts and I*p* is the peak current of the tunnel diodes in milliamperes.

References Cited

UNITED STATES PATENTS

| | | | |
|---|---|---|---|
| 3,027,464 | 3/1962 | Kosonocky | 307—286 X |
| 3,198,957 | 8/1965 | Husimi et al. | 307—293 X |
| 3,267,292 | 8/1966 | Dunnet et al. | 307—286 X |

(Other references on following page)

FOREIGN PATENTS 1,300,089 6/1962 France.

OTHER REFERENCES

Rymaszewski, E. J., IBM Technical Disclosure Bulletin, vol. 4, No. 2, July 1961.

Kunihiro, T., Applications of Tunnel Diodes in Switching Circuits, Univ. of Ill. Graduate College Digital Computer Laboratory, pages 17, 18, 19 and 25, Oct. 26, 1960.

ARTHUR GAUSS, *Primary Examiner.*

J. D. FREW, *Assistant Examiner.*

U.S. Cl. X.R.

307—206, 258, 286; 328—118